(12) United States Patent
Zdarsky et al.

(10) Patent No.: US 9,107,114 B2
(45) Date of Patent: Aug. 11, 2015

(54) METHOD FOR SUPPORTING QUALITY OF SERVICE MECHANISMS DURING A HANDOVER PROCESS OR IN PREPARATION OF A HANDOVER PROCESS

(75) Inventors: Frank Zdarsky, Karlsruhe/Durlach (DE); Patrick Stupar, Heidelberg (DE); Stefan Schmid, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 195 days.

(21) Appl. No.: 13/061,534

(22) PCT Filed: Sep. 1, 2009

(86) PCT No.: PCT/EP2009/006320
§ 371 (c)(1),
(2), (4) Date: May 23, 2011

(87) PCT Pub. No.: WO2010/022987
PCT Pub. Date: Mar. 4, 2010

(65) Prior Publication Data
US 2011/0237256 A1 Sep. 29, 2011

(30) Foreign Application Priority Data

Sep. 1, 2008 (EP) ..................... 08015389

(51) Int. Cl.
*H04W 36/00* (2009.01)
*H04W 36/18* (2009.01)
(Continued)

(52) U.S. Cl.
CPC .......... *H04W 36/0033* (2013.01); *H04W 28/26* (2013.01); *H04W 36/0044* (2013.01);
(Continued)

(58) Field of Classification Search
CPC .................. H04W 36/0033; H04W 36/0044; H04W 36/18; H04W 36/22; H04W 36/08; H04W 36/38
USPC .................................. 455/436, 437
See application file for complete search history.

(56) References Cited

U.S. PATENT DOCUMENTS 6,119,002 A * 9/2000 Alanara ............... 455/434
7,917,163 B2 * 3/2011 Amerga ............... 455/516
(Continued)

FOREIGN PATENT DOCUMENTS

JP  2006135994 A  5/2006
JP  2009531874 A  9/2009

OTHER PUBLICATIONS

International Search Report, dated Dec. 3, 2009, from corresponding PCT application.
(Continued)

*Primary Examiner* — Mehmood B Khan
(74) *Attorney, Agent, or Firm* — Young & Thompson

(57) ABSTRACT

A method for supporting quality of service (QoS) mechanisms during a handover process or in preparation of a handover process, wherein a user equipment (UE) attaches to an access network (AN) via points of attachment (PoA), wherein the handover process supports changing connection of the UE from one of the points of attachment—current PoA—to another one of the points of attachment—target PoA—while maintaining all ongoing connections of the UE, wherein signalling messages are exchanged between the current PoA and a second PoA during or in preparation of the handover process, the second PoA including the target PoA or a candidate for the target PoA, and wherein the AN supports inner QoS mechanisms on a communication path within the AN, the communication path being used for communication between one of the PoA and a core network (CN) or between one of the PoA and a network entity within the AN, is characterized in that a triggering message is sent to the second PoA by the current PoA, the triggering message being received by an UE proxy located on the second PoA, wherein the UE proxy, in reaction to the triggering message, controls the inner QoS mechanisms to ensure QoS on the communication path.

19 Claims, 2 Drawing Sheets

(51) Int. Cl.
  *H04W 36/22* (2009.01)
  *H04W 36/08* (2009.01)
  *H04W 36/38* (2009.01)
  *H04W 28/26* (2009.01)
  *H04W 36/26* (2009.01)
  *H04W 88/18* (2009.01)

(52) U.S. Cl.
  CPC ............... *H04W36/08* (2013.01); *H04W 36/18* (2013.01); *H04W 36/22* (2013.01); *H04W 36/26* (2013.01); *H04W 36/38* (2013.01); *H04W 88/182* (2013.01)

(56) References Cited

U.S. PATENT DOCUMENTS

| | | | |
|---|---|---|---|
| 7,953,411 B1* | 5/2011 | Chion | 455/436 |
| 2004/0008689 A1* | 1/2004 | Westphal et al. | 370/395.21 |
| 2005/0163078 A1* | 7/2005 | Oba et al. | 370/331 |
| 2006/0092879 A1 | 5/2006 | Jeong et al. | |
| 2006/0187858 A1* | 8/2006 | Kenichi et al. | 370/254 |
| 2006/0245394 A1* | 11/2006 | Baba et al. | 370/331 |
| 2007/0010252 A1* | 1/2007 | Balachandran et al. | 455/437 |
| 2007/0297364 A1* | 12/2007 | Fagridas | 370/331 |
| 2008/0137665 A1* | 6/2008 | Abondo | 370/395.21 |
| 2008/0310366 A1* | 12/2008 | Oba et al. | 370/331 |
| 2010/0246417 A1 | 9/2010 | Cheng et al. | |
| 2012/0064897 A1* | 3/2012 | Amirijoo et al. | 455/436 |

OTHER PUBLICATIONS

Vitor Jesus et al., "Integration of Mobility and QoS in 4G Scenarios", Internet Citation, retrieved from the Internet: URL:http://delivery.acm.org/10.1145/1300000/1298249/p47-jesus.pdf?key1=1298249&key2=6822960521&coll=GUIDE&dl=GUIDE&CFID=48022840&CFTOKEN=1932281, Oct. 22, 2007, pp. 47-54, XP-002542089.

Nikos Passas et al, "A New Approach for Fast Handovers in Mobile Multimedia Networks", Vehicular Technology Conference, May 17, 2004, pp. 2972-2976.

Fu Lin et al., "A Modified MRSVP Scheme Based on Motion Prediction", 2009 International Conference on Networks Security, Wireless Communications and Trusted Computing, Apr. 25, 2009, pp. 25-27.

Anup Talukdar et al., "MRSVP: A Resource Reservation Protocol for an Integrated Services Network with Mobile Hosts", Wireless Networks, 2001, pp. 5-19, vol. 7, No. 1, XP-001100301.

M. Liebsch et al., "Candidate Access Router Discovery (CARD)", IETF Standard, Internet Engineering Task Force, IETF, Jul. 1, 2005, pp. 1-46.

Wang Ying et al., "An Enhanced Media Independent Handover Framework for Heterogeneous Networks", Vehicular Technology Conference, May 11, 2008, pp. 2306-2310.

Takako Sanda et al., "A proposal for seamless QoS support in mobile networks", The Special Interest Group Technical Reports of IPSJ, 2004-MBL-29-23, May 14, 2004, Cited in JP OA.

Japanese Office Action dated Sep. 12, 2012 in corresponding 2011-524270.

* cited by examiner

METHOD FOR SUPPORTING QUALITY OF SERVICE MECHANISMS DURING A HANDOVER PROCESS OR IN PREPARATION OF A HANDOVER PROCESS

The present invention relates to a method for supporting quality of service (QoS) mechanisms during a handover process or in preparation of a handover process, wherein a user equipment (UE) attaches to an access network (AN) via points of attachment (PoA), wherein said handover process supports changing connection of said UE from one of said points of attachment—current PoA—to another one of said points of attachment—target PoA—while maintaining all ongoing connections of said UE, wherein signalling messages are exchanged between said current PoA and a second PoA during or in preparation of said handover process, said second PoA comprising said target PoA or a candidate for said target PoA, and wherein said AN supports inner QoS mechanisms on a communication path within said AN, said communication path being used for communication between one of said PoA and a core network (CN) or between one of said PoA and a network entity within the AN.

BACKGROUND OF THE INVENTION

In recent years several types of wireless communication systems have been developed. For example, wireless local area networks (WLAN) are widely spread nowadays, cellular networks, such as UMTS (Universal Mobile Telecommunication System), have gained paramount importance, and, most recently, WiMAX (World Wide Interoperability for Microwave Access) has been developed as a standard-based technology enabling the delivery of last mile wireless broadband access. Most of the new wireless communication techniques provide the benefit of higher bandwidth to its users. With increasing capabilities of wireless communication systems, new services over the wireless link, like video telephony, video streams or high quality audio streams, became feasible. The combination of new wireless communication techniques and new services results in improved availability and convenience for the user.

Many of these services need certain quality of service for being accepted by the users. As additionally high data rates are required, increasing demands on the resources of the access network (AN) emerge. Very often, these requirements were fulfilled by providing enough resources at the AN for handling each possible wireless link at the highest data rate provided by the wireless system. Due to the high costs and due to the higher data rates that are available at new systems, this approach is not acceptable at new wireless communication techniques. Hence, quality of service (QoS) management is introduced in ANs which aims at granting sufficient resources to individual or groups of traffic flows so that they can meet specified performance objectives. These performance objectives include providing sufficient bandwidth or handling data packets with less than a maximum delay or jitter.

There exist a number of different QoS architecture and mechanisms for providing QoS for traffic flows in networks. At ANs, basically two QoS architectures are known in the art: IntServ and DiffServ. At IntServ, resources of AN network entities are allocated explicitly for each data flow. When a data flow is established, the demanded resources of the AN are allocated or reserved. Using DiffServ, resources are allocated to several traffic classes. Each data packet contains a traffic class marker concerning to which prioritisation or queuing of the data packet is defined. Generally, IntServ is preferred at ANs with restricted resources and remarkable variations of network load.

In a general scenario, a mobile node like a user's communication device/terminal, in the following referred to as user equipment (UE) is attached to an AN via points of attachment (PoA). Generally, the access link between UE and PoA is provided by wireless communication techniques. In the access network, substantially cable-based transmission on copper or fibre optic cables is used. As each packet or data flow should be handled according to their respective QoS requirements, these requirements have to be made known to the inner QoS mechanism of the AN. Each entity involved in communication between the UE and its communication partner has to be aware of the QoS requirements. This information is basically exchanged at the allocation of resources.

As standard approach at providing QoS mechanisms at communication between a UE and an AN is to extend the inner QoS mechanism of the AN to the UE. A QoS managing function (QoS MF) is running at the UE and is used at allocation or reservation of resources at the communication path. The QoS MF signals QoS requirements to its PoA which sends QoS signalling to the next hop entity that needs to allocate resources along the communication path. A drawback of this approach arises from the fact that each UE has to be aware of the inner QoS mechanism of the AN. This results in compatibility and security problems. A UE that does not know the inner QoS mechanism of an AN is not able to communicate using QoS. On the other hand the inner has to be exposed to the UE which might be used by attackers at blocking network resources of the AN. Another drawback is the need of connectivity of the UE. If the UE is not attached to a PoA, no QoS signalling can be exchanged and thus no resources can be allocated. The latter drawback is particularly problematic at performing handover of UEs from one PoA to a second PoA. A handover might be reasonable, if the current access link provides poor QoS or if another PoA provides communication at lower costs. At the above-mentioned approach of QoS allocation, a UE has to establish a link to a second PoA in order to perform allocation of resources, while keeping the current link for continued communication.

This problem is solved by handover mechanisms like the media independent handover (MIH) mechanism of the IEEE 802.21 standard draft, which typically allows UEs to perform resource availability checks and resource allocation without establishing a link to a PoA. However, this handover mechanism just refers to the access link, i.e. the link between the UE and the current, candidate or target PoA, respectively. MIH does not support testing of resource availability or allocation of resources at the AN.

SUMMARY OF THE INVENTION

It is therefore an object of the present invention to improve and further develop a method of the initially described type for supporting QoS mechanisms during a handover process or in preparation of a handover process in such a way that involvement of a UE is reduced to a minimum or even avoided.

In accordance with the invention, the aforementioned object is accomplished by a method comprising the features of claim 1. According to this claim, such a method is characterized in that a triggering message is sent to said second PoA by said current PoA, said triggering message being received by an UE proxy located on said second PoA, wherein said UE proxy, in reaction to said triggering message, controls said inner QoS mechanisms to ensure QoS on said communication path.

According to the invention it has first been recognized that allocation or reservation of resources on a communication path between a UE and a network entity within the AN or between a UE and a core network (CN) is possible with substantially reduced or even without involvement of the UE. For that reason and according to the invention, a UE proxy is provided at a second PoA to which a handover may potentially or will occur. This UE proxy is aware of the inner QoS mechanism used within the AN and is capable in controlling the inner QoS mechanism. By providing a UE proxy at the second PoA, QoS can be ensured on communication paths used by UE while UE does not have to be aware of the inner QoS mechanism. Thus, security and compatibility can be increased.

At performing or at preparing a handover process, a triggering message is send to the second PoA by the current PoA. This triggering message induces the second PoA to perform a QoS operation. At the second PoA, the triggering message is received by the UE proxy which—triggered by the triggering message—controls the inner QoS mechanism of the AN on the communication path. Thus, QoS operations can be performed at the second PoA without involvement of the UE. When a handover should be performed, the imminent handover is indicated to the current PoA which initiates QoS operations at the second PoA using the triggering message. Thus, complete QoS signalling is kept within the AN and no QoS signalling messages have to be exchanged between the UE and a PoA.

The term "second PoA" refers to a PoA to which a handover may potentially or will be performed. The second PoA may be a target PoA or a candidate for the target PoA. A target PoA is the point of attachment to which the UE is attached after the handover process. A candidate for the target PoA is a point of attachment which is potentially able to provide a link to UE. Whether a handover is performed to the candidate PoA or not, depends on various additional constraints, e.g. availability of resources, policies, provided QoS or the like.

The term "Point of Attachment" refers to each kind of entity which is able to establish a Layer 2 connection with a UE. The PoA might be a UMTS base station, a WLAN access point, a WiMAX base station or the like. A PoA is not necessarily a single physical box. It might also be divided in two or even more physical devices. For instance, parts of the functionality might be located at a base station while other parts are located at an access router which links several base stations to each other. The access link between the UE and the PoA generally is based on a wireless communication technique. However, it also might be cable-based using Ethernet or the like.

The term "Access Network" refers to the network transmitting data from and to the PoAs. The AN is substantially cable-based. It connects the PoAs with a provider's CN. As the terms access network, backhaul network, core network and their respective boundaries are not well defined, it should be understood that the term access network refers to the network which is used for communication between a PoA and a CN, where the CN is a high speed network transporting data packets to remote servers, computers, other UEs or similar network entities. The AN in this context might also contain a network which might be described as backhaul network.

In the following, communication between UE and its communication partner refers to communication between the UE and a network entity within the AN (a PoA, a server, a second UE or the like) or communication between the UE and the CN. It should be understood that the device, from which data is retrieved or to which data is sent, has to be located within the AN. The device might also be located in the CN or third network which might communicate with the CN or the AN.

At using the method concerning to the invention, controlling of the inner QoS mechanism may comprise several steps which might also be combined with each other. One possible step performed for controlling the inner QoS mechanism comprises testing of resource availability. The testing step includes checking, whether enough resources are available for communication on a communication path between the UE and its communication partner. Each entity involved in the communication has to be able to provide the required QoS. If one network entity is not able to provide the demanded QoS, the complete communication path cannot provide the demanded QoS for this communication. Thus, resource availability should be checked at each network entity or should be estimated for each network entity involved in the communication. Alternative communication path might be searched in cases where no or too less resources are available at the communication path. If no suitable communication path can be found, a lower but achievable QoS can be reported to the querying entity.

Another step which might be performed for controlling inner QoS mechanism is allocation of resources. This allocation step is generally performed, if handover to the second PoA will be performed soon and the communication path will be used for communication shortly after that. At allocation of resources, each network entity involved in communication on the communication path between an UE and its communication partner allocates the required resources in order to provide a certain QoS. This step might also include reservation of resources. At reservation, availability of the resources is guaranteed for the data flow. At allocation, the resources are most likely available.

Once recourses are allocated, the allocated resources may be changed in a changing step which might also a step for controlling inner QoS mechanism. This step might be necessary, if the demands of a data flow change, if a UE is no longer allowed to communicate with high QoS or if availability of resources on the communication path had changed.

A communication path used for communication between a UE and its communication partner may include a tunnel link. The tunnel link might be implemented in a wireless or a cable based network. At a wireless network, the tunnel link might be implemented in a multi-hop network. Generally these tunnel links are restricted concerning their bandwidth or delay on this tunnel link. These constraints directly correspond with the QoS which is available at the communication path.

Advantageously, the UE proxy uses a QoS managing function (QoS MF) for controlling inner QoS mechanism. The separation of UE proxy and QoS MF in two different functional blocks is beneficial to that extent that the QoS MF can be exchanged easily, if the inner QoS mechanism changes. Further the UE proxy may be connected to several QoS MFs which provide different QoS mechanisms. These different QoS mechanisms might be used QoS for different communication paths. Resulting from the separation, the UE proxy is also completely independent from the inner QoS mechanism used in the AN. UE proxy and QoS MF may communicate using QoS SAP (Service Access Point) primitives or might use other protocols which are independent to the used QoS mechanism.

At this embodiment of the invention, the QoS MF may be located on the second PoA like the UE proxy. However, it should be understood that—in connection with a method according to the invention—the term PoA not necessarily refers to a single physical box, but might also be divided in two or more boxes. The PoA might be divided in a base station and an access router which might connect several base stations. The QoS MF might also be implemented at the access router which should be regarded as being located on the PoA.

When using a QoS MF at the second PoA, the QoS MF may send QoS signalling to network entities involved in communication on the communication path. In that way, the QoS MF performs each signalling which is specific to the QoS mechanism used at the AN. The UE proxy only sends certain QoS primitives to the QoS MF which might be completely independent to the inner QoS mechanisms used on the communication path.

Additionally or alternatively the UE proxy might trigger a third network entity which is responsible for sending QoS signalling to the network entities of the communication path. This allows establishing a central network entity which is responsible for QoS signalling within the AN or parts of the AN. Thereby the third network entity might also be used at choosing suitable communication paths connecting the second PoA with UE's communication partner. The third entity might store information about available resources. Further, replacement of an inner QoS mechanism by a new inner QoS mechanism is easier to be performed, as there are just a few network entities which have to be adapted.

Advantageously, QoS signalling used for controlling the inner QoS mechanisms is past from one network entity to another network entity. In this manner a signalling message is transmitted from one entity to the next entity on the communication path so that a QoS signalling message is transmitted on the same path as data packets used for communication. In this manner, no separate infrastructure for transmitting QoS signalling is necessary.

Alternatively QoS signalling might be transmitted directly from the entity generating the QoS signalling to the respective network entity which should perform the QoS operation, i.e. test resource availability, allocate resources or change allocated resources. The entity generating QoS signalling might be the above-mentioned central third network entity or the second PoA.

These two approaches of transmitting QoS signalling may be combined. In such implementation, several network entities used on the communication path receive QoS signalling from the central third network entity or the second PoA and transmit QoS signalling to its neighbour or neighbours. In this way, especially on long communication paths time for spreading QoS signalling is reduced.

In order to enable UE proxy to control the inner QoS mechanism, the UE proxy has to have information about the ongoing connections of the UE. The UE proxy needs information about those data flows which should be handled by the PoA to which the UE proxy is related. This information as well as the respective QoS constraints may be stored at the UE proxy. Alternatively or additionally information on ongoing connections of the UE may be transmitted using signalling messages. These signalling messages are exchanged between the current PoA and a second PoA. In this manner the second PoA receives current information about ongoing connections from the current PoA.

Further, the UE proxy may query information from a server within the AN or within a core network (CN). This information may include QoS policies, requirements of the UE, requirements of traffic flows of the UE, information on ongoing connections of the UE, or the like. This server may be a central network entity which provides information to each PoA or to each network entity querying information within the AN or part of the AN. In this way information are provided at a central point and need not to be updated on many different entities within the AN.

After completion of the QoS operation which was triggered by the triggering message from the current PoA, the UE proxy signals completion to the current PoA. This reply may contain information, whether recourses are available on the requested communication path. Alternatively, the reply may contain information about successful allocation of resources or successful changing of allocated recourses. It may also contain information that no resources are available or allocation or a change of allocated resources had failed. The reply may also contain other information like information on the best QoS which can be provided but which is less than demanded. This information can be used, if no communication path can be found providing the demanded QoS.

In case of resource allocation as QoS operation, the completion of allocation may be signalled to the UE. The according message can be sent to the UE by the current PoA. This message indicates UE both availability of an access link to a new PoA and the possibility of performing a handover to the new PoA providing the demanded QoS. Altogether, allocation of resources on the communication path is performed within the access network without UE involvement and the UE receives information about allocation of resources by means of the current PoA without establishing another connection to another PoA. Also with other QoS operations, like testing availability of resources or at changing allocated resources, completion of the QoS operation can be signalled to the UE by the current PoA.

The method according to the invention can be used in connection with several QoS mechanisms. Preferably the QoS mechanism is based on explicit signalling or packet markers. Explicit signalling is used in order to allocate resources on a communication path. An example for this kind of QoS mechanism is the DiffServ architecture described in RFC 2474 and RFC 2475. At using packet markers, each transmitted data packet contains a marker, concerning to which the data packet is handled or queued. At using packet markers, each network entity establishes and updates a list of all data flows which are currently directed over the network entity. When availability of resources is checked, it is tested, whether resources—concerning to the information provided in the list—are available for the new data flow on the communication path. For simplicity, this list might be kept at the egress, i.e. the first network entity on the communication path and/or by the egress, i.e. the last network entity on the communication path before entering the CN. One example for a QoS mechanism using packet markers is IntServ described in RFC 2210.

The handover process may be initiated by several entities. On the one hand the handover process might by initiated by the UE. This might be reasonable in cases where the UE detects a PoA which provides higher signal quality than the current PoA, or where another network technique which might be used with lower cost is available. An example for the latter case might be a handover from UMTS to WLAN. On the other hand the handover process might be initiated by the PoA. This might be useful in cases, where the current PoA experiences high load while another PoA in close proximity has available resources. Then a handover from the current PoA to the other PoA may be performed. Further, the handover might be initiated by a central entity within the AN. This might be used, if a UE is no longer allowed to communicate via the current PoA, for instance due to a used up credit of the user.

Preferably, communication on the system used with the method concerning the invention is performed using media independent handover (MIH) abstraction layers. A MIH abstraction layer at the UE is used at communication with the current PoA or the second PoA. Communication partner on the respective PoA is another MIH abstraction layer. Also communication between the PoAs may be performed using MIH abstraction layers. Preferably, MIH abstraction layers according to the IEEE 802.21 standard are used.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figures on the other hand. In connection with the explanation of the preferred embodiments of the invention by the aid of the figures, generally preferred embodiments and further developments of the teaching will we explained.

DETAILED DESCRIPTION OF THE PREFERRED EMBODIMENTS

Figure 1:
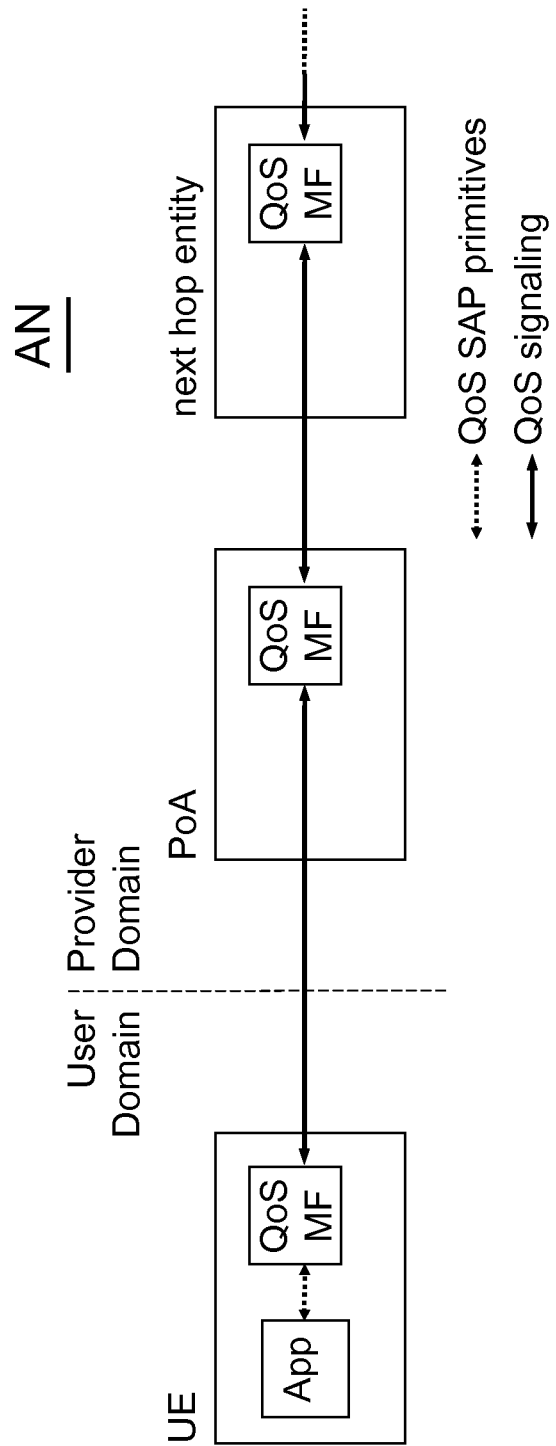
FIG. 1 is a schematic view of a system concerning the state of the art which is used for providing QoS mechanisms at the UE.
Figure 2:
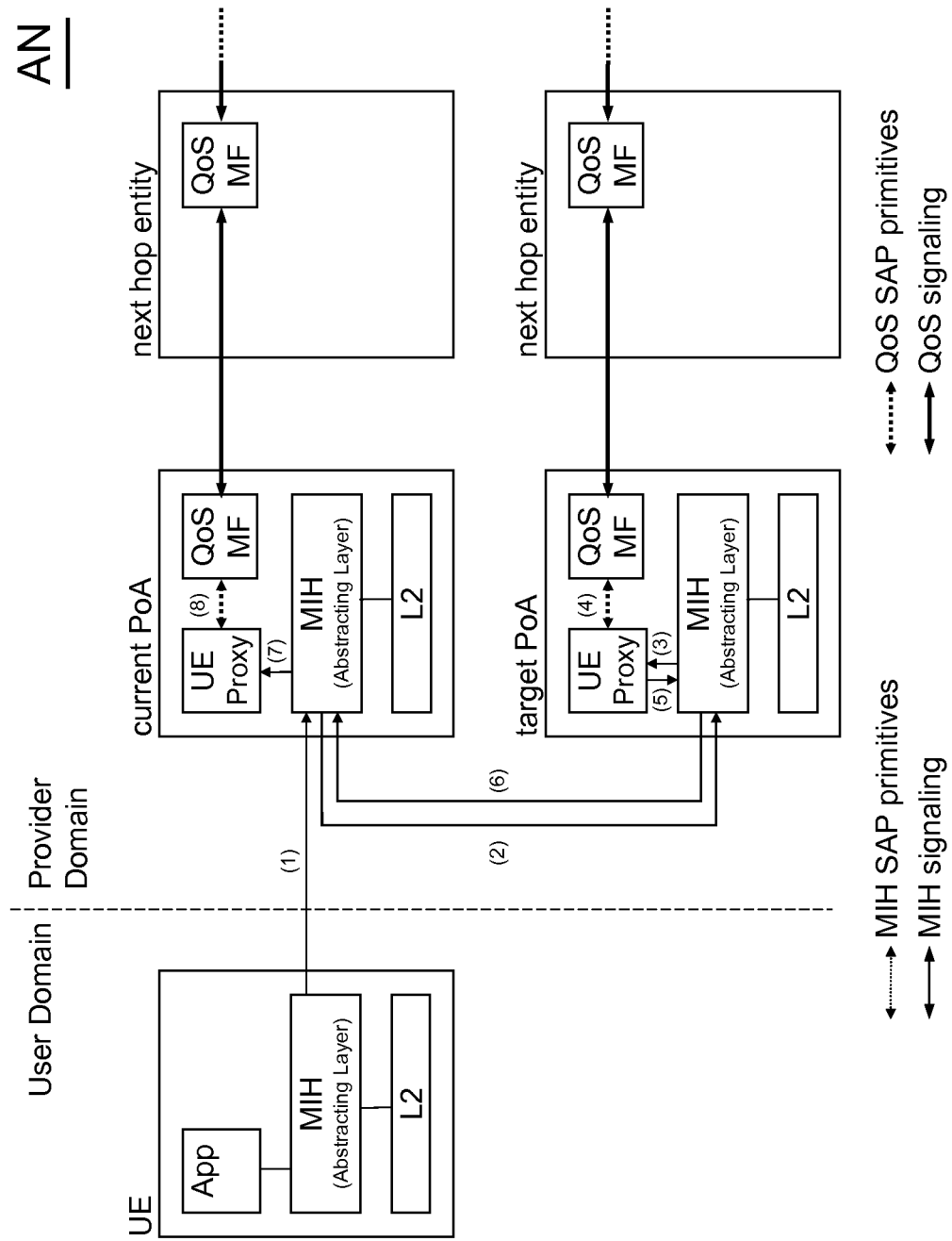
FIG. 2 is a schematic view of an example of an application scenario of a method according to the invention.

FIG. 2 shows an example of an application scenario of a method concerning to the invention. At the user domain, an application App is running on a user equipment UE. The App needs certain QoS requirements which are signalled to a media independent handover (MIH) abstraction layer. MIH abstraction layer is located on Layer 2 of the OSI (Open System Interconnection) Reference Model. UE is connected to a point of attachment—current PoA—on the provider domain. At step (1), the UE indicates to its current PoA that a handover process should be initiated. Additionally, the UE transmits a list of candidates for target PoA to which the UE might be attached after the handover process. A MIH abstraction layer on the current PoA receives these messages and sends triggering messages to at least one of the candidates for target PoA from the list provided by the UE. In the following, a candidate for target PoA or a target PoA is referred to as second PoA. Each second PoA which receives a triggering message receives it at its MIH abstraction layer and indicates the imminent handover to a UE proxy on the target PoA. The UE proxy controls the inner QoS mechanism of the AN using a QoS managing function QoS MF. The UE proxy uses QoS SAP primitives at communication with the QoS MF. If the second PoA has available resources, the QoS MF sends QoS signalling to the QoS MF of the next hop entity. At the next hop entity, availability of resources is checked and, if resources are available, the next neighbour network entity on the communication path is connected via QoS signalling. In this way QoS signalling is sent to each network entity on the communication path and each network entity checks for availability of resources. When the last entity on the communication path is reached, the QoS MF of this entity generates a reply back to the second PoA. The reply is transmitted from network entity to network entity on the communication path until it reaches at the second PoA. If a QoS MF of a network entity discovers during the querying step that no resources are available, QoS signalling is not sent to the neighbouring next hop entity, but a negative reply is send back to the previous hop entity back to the second PoA. The positive or negative reply is received at the QoS MF of the second PoA and signalled to the UE proxy via QoS SAP primitives. The UE proxy signals the availability or non-availability of resources to the MIH abstraction layer which generates a signalling message to the current PoA. This signalling message is receive at the MIH abstraction layer at the current PoA.

After the current PoA received replies from each of the queried second PoA or after a certain timeout, the current PoA chooses the most suitable target PoA from the second PoAs which replied to the triggering message. The current PoA sends, in step (2), another triggering message to the target PoA. The triggering message is received at MIH abstraction layer which in reaction to the triggering message indicates, in step (3), an imminent handover to the UE proxy on the target PoA. In step (4), the UE proxy uses the QoS MF in order allocate recourses along the new communication path. Similar to the step of testing availability of resources, QoS signalling is sent from the target PoA to the next hop entity which in reaction allocates the requested resources and sends QoS signalling messages to its neighbouring next hop entity. After reaching the last hop entity on the communication path, an acknowledgement message is sent back to the target PoA on the communication path. If a next hop entity has no resources available, e.g. if the recourses have been allocated to another data flow (between resource availability test and allocation), this network entity will not send QoS signalling to its neighbouring next hop entity, but will send a reply back to the target PoA via the single network entities on the communication path. A reply indicating successful or failed allocation of recourses is received by the UE proxy of the target PoA which in reaction signals the result of the QoS operation to the MIH abstraction layer.

In the following, we assume that allocation was successful. In this case, UE proxy signals allocation completion to the MIH abstraction layer (step (5)). Now target PoA and communication path are prepared for handover process. Completion of preparation is signalled to the UE. This might either be performed by a signalling message to the current PoA which in reaction sends a signalling message to the UE including the target PoA selected for handover. In another scenario the target PoA connects UE using media independent handover (MIH) mechanism according to IEEE 802.21 and indicates readiness for handover. Independent of the way how signalling to UE is performed, the handover process will take place after signalling is received. After completion of the handover process, the MIH abstraction layer of the target PoA signals the former "current PoA" that handover is completed (step (6)). In step (7), handover completion is signalled to the UE proxy of the former "current PoA" which uses in step (8) its QoS MF to release resources on the old communication path.

As can be easily seen from the above description of the example scenario, a UE is almost not involved in the handover process and the allocation of resources on the communication path. The complete inner QoS mechanism can remain unknown to the UE and is performed within the AN on the provider domain.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for adapting quality of service (QoS) mechanisms during, or in preparation of, a handover process for changing connection of a user equipment (UE) from a first point of attachment (PoA) of an access network (AN) to a target PoA of the AN, said AN capable of inner QoS mechanisms for maintaining quality of service (QoS) on a communication path within said AN for communication between said PoA and a network entity within said AN or a core network in connection with said AN, the method comprising:
   exchanging handover signalling messages between said first PoA and a second PoA during, or in preparation of, said handover process;
   sending, from said first PoA, a triggering message to said second PoA;
   receiving said triggering message at an UE proxy located on said second PoA, the UE proxy being configured to generate signals for controlling said inner QoS mechanisms; and
   at said UE proxy, in response to said triggering message, controlling said inner QoS mechanisms to ensure QoS on said communication path for said UE,
   wherein transmission of said generated signals for controlling said inner QoS mechanisms comprises excluding transmission of said generated signals to the UE such that said inner QoS mechanisms are unknown to said UE, and
      the UE transmitting to the first PoA, a list identifying a plurality of candidate PoAs that are accessible to the UE via wireless communication,
      the first PoA transmitting a triggering message to each of the candidate PoAs, and
      receiving, by UE proxies at each of the candidate PoAs, the triggering message.

2. The method according to claim 1, wherein the step of controlling said inner QoS mechanisms comprises at least one of testing availability of resources, allocating resources, and changing allocated resources, said resources being the resources of network entities involved in communication on said communication path.

3. The method according to claim 1, wherein said communication path includes a tunnel link.

4. The method according to claim 1, wherein in controlling said inner QoS mechanisms, said UE proxy uses a QoS management function (QoS MF), said QoS MF being located on said second PoA.

5. The method according to claim 4, wherein QoS signalling is sent to network entities by said QoS MF, said network entities being involved in communication on said communication path.

6. The method according to claim 1, wherein in controlling said inner QoS mechanisms, a third network entity sends QoS signalling to network entities involved in communication on said communication path, said QoS signalling of said third network entity being triggered by said UE proxy.

7. The method according to claim 5, wherein said QoS signalling is passed from one of said network entities to another one of said network entities in such a way that said signalling message is transmitted on said communication path.

8. The method according to claim 1, wherein said UE proxy stores information on an ongoing connection of said UE along with information of constraints related to said ongoing connection.

9. The method according to claim 1, wherein said UE proxy queries QoS policies, requirements of said UE, requirements of traffic flows of said UE, or information on ongoing connections of said UE from a network entity within said AN or said CN.

10. The method according to claim 1, wherein said signalling messages contain information on ongoing connections of said UE and their respective constraints.

11. The method according to claim 1, wherein completion of a QoS operation triggered by said triggering message is signalled to said first PoA by said UE proxy, said QoS operation comprising testing availability of resources, allocating resources or changing allocated resources.

12. The method according to claim 1, wherein completion of said QoS operation is signalled to said UE by said first PoA, said QoS operation comprising testing availability of resources, allocating resources or changing allocated resources.

13. The method according to claim 1, wherein said QoS mechanisms are based on explicit signalling or packet markers, said packet markers being part of each data packet transmitted on said communication path.

14. The method according to claim 1, wherein said handover process is initiated by said UE, by said PoA, or by a central entity within the AN.

15. The method according to claim 1, wherein communication between said first PoA and said UE proxy or communication between said UE and said first and second PoAs is performed using media independent handover (MIH) abstraction layers.

16. The method according to claim 2, wherein said communication path includes a tunnel link.

17. The method according to claim 6, wherein said QoS signalling is passed from one of said network entities to another one of said network entities in such a way that said signalling message is transmitted on said communication path.

18. The method according to claim 13, wherein said QoS mechanisms are based on DiffServ or IntServ.

19. The method according to claim 1, wherein the handover process for changing connection of the UE from the first PoA of the AN to the target PoA of the AN takes place within the data link layer (layer 2) of the Open Systems Interconnection (OSI) model.

* * * * *